US008031451B2

(12) United States Patent
Beneditz et al.

(10) Patent No.: US 8,031,451 B2
(45) Date of Patent: Oct. 4, 2011

(54) SOLID STATE POWER CONTROL MODULE WITH REMOVAL DETECTOR

(75) Inventors: Bruce D. Beneditz, Rockford, IL (US); Jeffrey T. Wavering, Rockford, IL (US); Dennis R. Anderson, Rockford, IL (US); Josef Maier, Munningen (DE); Mark Hamilton Severson, Rockford, IL (US); Massoud Vaziri, Redmond, WA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 215 days.

(21) Appl. No.: 12/348,997

(22) Filed: Jan. 6, 2009

(65) Prior Publication Data

US 2010/0172062 A1 Jul. 8, 2010

(51) Int. Cl.
*H02H 3/08* (2006.01)

(52) U.S. Cl. ...................................................... 361/93.1

(58) Field of Classification Search ................. 361/93.1, 361/93.2, 93.3
See application file for complete search history.

(56) References Cited

U.S. PATENT DOCUMENTS

| | | | | |
|---|---|---|---|---|
| 4,819,144 | A | 4/1989 | Otake | |
| 5,089,689 | A * | 2/1992 | Kidder et al. | 219/506 |
| 5,497,072 | A | 3/1996 | LeComte et al. | |
| 5,723,915 | A | 3/1998 | Maher | |
| 5,752,047 | A | 5/1998 | Darty | |
| 5,867,095 | A * | 2/1999 | Klein et al. | 340/506 |
| 6,145,308 | A | 11/2000 | Bueche | |
| 6,470,224 | B1 * | 10/2002 | Drake et al. | 700/22 |
| 6,768,350 | B1 | 7/2004 | Dickey | |
| 7,064,448 | B2 | 6/2006 | Maier | |
| 7,193,337 | B2 | 3/2007 | Nguyen | |
| 7,292,011 | B2 | 11/2007 | Beneditz | |
| 7,301,742 | B2 * | 11/2007 | Tignor et al. | 361/93.3 |
| 7,505,820 | B2 * | 3/2009 | Plivcic et al. | 700/22 |
| 2009/0134715 | A1 * | 5/2009 | Mozar | 307/126 |

* cited by examiner

*Primary Examiner* — Jared Fureman
*Assistant Examiner* — Terrence Willoughby
(74) *Attorney, Agent, or Firm* — Carlson, Gaskey & Olds, PC

(57) ABSTRACT

A solid state power control module contains non-volatile memory. A switch for opening is provided to break a supply of power to a component. The switch is operable to trip (open) when an undesirable condition is detected, and further to be opened upon receiving a control signal. A status of the switch is stored in the non-volatile memory. A detector is provided for identifying when a module has been mounted in a housing, and communicates with the non-volatile memory if it is determined that the module is newly installed in a housing. A system and method are also claimed.

14 Claims, 1 Drawing Sheet

SOLID STATE POWER CONTROL MODULE WITH REMOVAL DETECTOR

BACKGROUND OF THE INVENTION

This application relates to a solid state power control module that includes the ability to detect when it has been removed and placed in a new position.

Solid state power controls (SSPCs) operate in complex electronic control systems. SSPCs typically operate as electronic circuit breakers, and also provide an on/off function under the direction of a main controller. The main controller typically controls a plurality of SSPCs, to control supply of power from a source of power to a plurality of components. One increasingly utilized application is on aircraft.

The SSPCs provide benefits over the standard mechanical circuit breakers. However, a method of remembering whether a module is in an open/tripped status is required. Thus, non-volatile memories (NVM) are included on the SSPC modules. These memories remember the current status of the module. The main controller also stores the status. One deficiency with this approach is that when a module is removed and replaced the expected status of the SSPC module goes with the removed module. Thus, it is necessary that the SSPC does not turn on when power is applied until its trip/open/close state is verified by the main controller. This results in a delay to power always on loads on power up while the main controller is booting up.

SUMMARY OF THE INVENTION

A solid state power control module contains non-volatile memory. A switch for opening is provided to break a supply of power to a component. The switch is operable to trip when an undesirable condition is detected, and further to be opened upon receiving a control signal. A status of the switch is stored in the non-volatile memory. A detector is provided for identifying when a module has been mounted in a housing, and communicates with the non-volatile memory if it is determined that the module is newly installed in a housing. A system and method are also claimed.

These and other features of the present invention can be best understood from the following specification and drawings, the following of which is a brief description.

DETAILED DESCRIPTION OF THE PREFERRED EMBODIMENT

Figure 1:
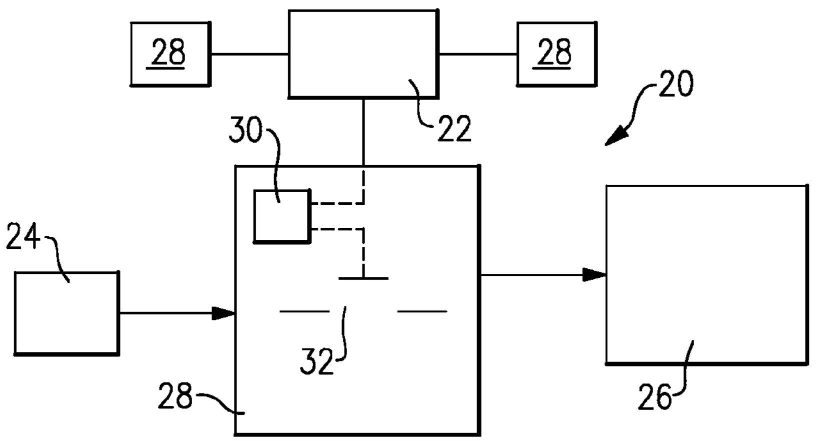
FIG. 1 schematically shows an electronic control system.

A power supply system 20 is illustrated in FIG. 1, and includes a main controller 22 communicating with a SSPC module 28. The SSPC module 28 has a memory 30, which remembers the status of a switch 32. Switch 32 opens when a condition exists that would suggest a circuit breaker trip, such as an overly high current condition. In addition, the main controller 22 instructs the switch 32 to open or close. The switch is opened or closed to communicate a supply of power 24 to a component 26. As shown, the main controller 22 may communicate with a plurality of modules 28, which each control the flow of power to distinct components. One application for such a system is on an aircraft.

The SSPC modules are known, and may be as described for example in U.S. Pat. No. 7,064,448, or 7,292,011, the disclosure of which is incorporated by reference. Of course, other SSPCs will benefit from this invention.

The SSPC may be used as a traditional circuit breaker. In that case control 22 would configure the SSPC to be always on. The SSPC could then provide power to the load as soon as it receives power without having to wait for direction from the main controller. When a trip condition occurs, the switch 32 will open and as indicated above, the non-volatile memory 30 remembers the state. However, at times, a module 28 may be removed or replaced. When a module is replaced, the memory 30 in the replacement module may not contain the correct state for the SSPC. This potential event requires the SSPC wait for confirmation of its state from the main controller at every power up and results in the SSPC having to wait for confirmation every time power is applied.

The present invention provides an improved methodology of only having to wait when the SSPC module is first installed in a new location thus allowing the SSPC to apply power to its load immediately when the status is closed if it is confirmed the module has not been moved.

Figure 2:
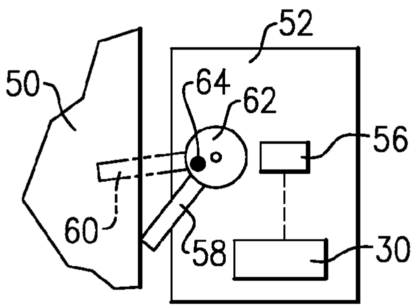
FIG. 2 shows a first embodiment.

As shown in FIG. 2, a module 52 is provided with a detector to detect when it has been removed and replaced. As shown, the module 52 is positioned against a wall 50 of a housing. A lever 58 may be spring biased to a free position 60 shown in phantom. However, when the module 52 is mounted within the housing 50, the lever 58 is biased away from the free position. A ring 62 may turn with the lever arm 58 as in a ratchet connection. An element 64 on the ring 62 will index to a new position each time the ring 62 is rotated by the lever 58, in much the same way a tally counter is indexed each time the counting button is pressed. A sensor 56 may sense the position of the element 64. The material of element 64 and the sensor's operation to detect the method may be as known.

When the SSPC module 52 is powered up, the detector 56 looks for the position of the element 64. If the element is in the same location that it was when the SSPC last powered up, then the non-volatile memory 30 will maintain its prior status and the switch 32 can be immediately set to that prior state. However, if the detector 56 determines that the element 64 has moved, then the non-volatile memory 30 will wait for the main controller 22 for the proper status. In this manner, the removal and replacement of the module will be detected, and there will be no possibility for an SSPC module, which should be in an open/tripped state, to undesirably pass power.

Figure 3:
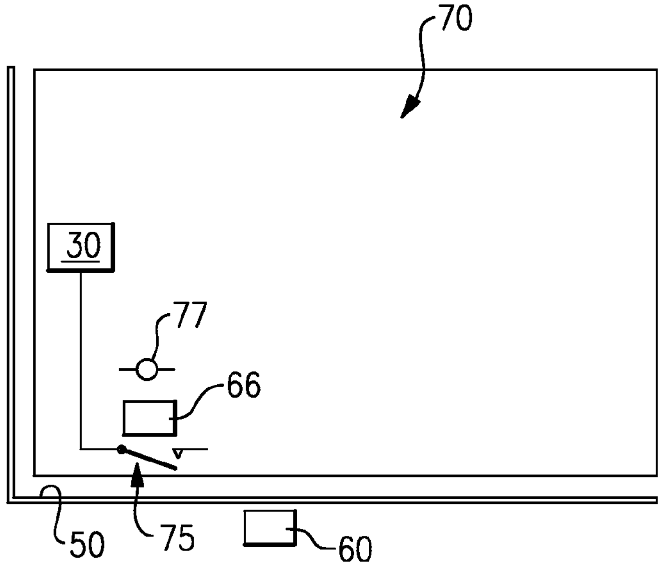
FIG. 3 shows a second embodiment.

FIG. 3 shows another embodiment of an SSPC module 70 wherein a magnetically latching switch 75 is used to determine if the module has been removed and replaced, or newly installed. When the module is removed or installed in the housing, the magnetically latching switch passes past a strong permanent magnet 60 that is part of the housing 50. This causes the magnetically latching switch 75 to open. A weak permanent magnet 66 is not strong enough to close the switch 75 after the switch 75 has passed by the strong permanent magnet 60.

If the module 70 powers up and detects that the magnetically latching switch 75 is in the open position then the non-volatile memory 30 will wait for the main controller 22 for the proper status. Once the SSPC has the proper status it will energize the electromagnet 77 to pull the magnetically latching switch 75 to the closed position. The weak permanent magnet 77 will hold the magnetically latching switch 75 in the closed position after the electromagnet 77 is de-energized. If the module 70 powers up and detects that the magnetically latching switch 75 is in the closed position, then the status of the SSPC in non-volatile memory 30 is valid and the SSPC can be immediately set to the state specified in the non-volatile memory 30. Thus the position of the magnetically latching switch 75 can be used to determine if the module has been replaced. While all electrical connections are not shown, a worker in this art would be able to easily tailor suitable connections. Notably, switch 75 provides a separate control circuit distinct from switch 32.

Figure 4:
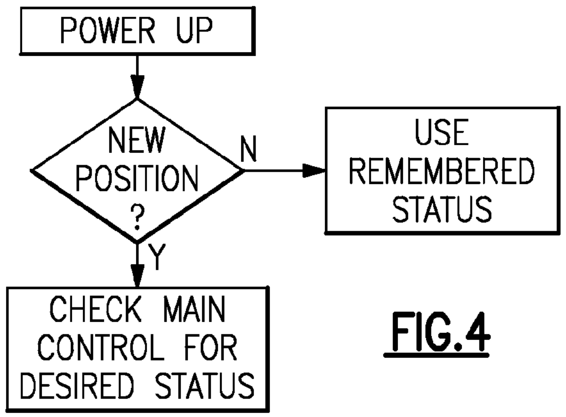
FIG. 4 shows a flow chart for the invention.

As shown in FIG. 4, a flow chart of the present invention checks at power-up to determine whether the module appears to have a new position. If it does, then the main controller is checked for the desired status. If the desired status is distinct from the stored position, then the switch 32 is moved to the desired position. If there is no new position detected, then the remembered position is utilized.

Although embodiments of this invention have been disclosed, a worker of ordinary skill in this art would recognize that certain modifications would come within the scope of this invention. For that reason, the following claims should be studied to determine the true scope and content of this invention.

What is claimed is:

1. A solid state power control module comprising:

a non-volatile memory;

a switch for opening to break a supply of power to a component, said switch being operable to trip when an undesirable condition is detected, and further to be opened upon receiving a control signal, and a status of said switch being stored in said non-volatile memory; and a detector on the module for detecting when the module has been mounted in a housing, and communicating with said non-volatile memory if it is determined that the module has been newly mounted in a housing, said detector including a portion that moves when newly received in the housing.

2. The module as set forth in claim 1, wherein the portion is a lever on the module moved by the housing, the lever moving a second element when it moves, and there being a detector for detecting the movement of the second element.

3. The module as set forth in claim 2, wherein the detector is an electronic detector.

4. The module as set forth in claim 1, wherein a switch is provided on said module, and is opened when the module is newly mounted within a housing, said module including a magnetic element such that when the module is first powered up after having been newly mounted, said switch will close, such that upon subsequent power-ups it will be determined that said module is not newly mounted.

5. The module as set forth in claim 1, wherein said module queries a main controller if a determination is made that the module has been newly mounted since its last power-up.

6. An electronic control system comprising:

a main controller communicating with at least one solid state power controller module, said solid state power controller module controlling the flow of power from a source of power to at least one component;

said solid state power controller module including a non-volatile memory, a switch for opening to break a supply of power to the at least one component, said switch being operable to trip when an undesirable condition is detected, and further to be open upon receiving a control signal, and a status of said switch stored in said non-volatile memory, a detector for detecting when the module has been mounted in a housing, and communicating with said non-volatile memory if it is determined that the module has been newly mounted in a housing; and said module queries said main controller if the detector detects that the module has been newly mounted since its last power-up, said main controller instructing said module for a proper state of said switch, and said module moving said switch to a prior state stored in said non-volatile memory if it is not determined that the module has been newly mounted in a housing.

7. An electronic control system comprising:

a main controller communicating with at least one solid state power controller module, said solid state power controller module controlling the flow of power from a source of power to at least one component;

said solid state power controller module including a non-volatile memory, a switch for opening to break a supply of power to the at least one component, said switch being operable to trip when an undesirable condition is detected, and further to be open upon receiving a control signal, and a status of said switch stored in said non-volatile memory, a detector for detecting when the module has been mounted in a housing, and communicating with said non-volatile memory if it is determined that the module has been newly mounted in a housing; and said detector including a portion that moves when newly received in the housing.

8. The system as set forth in claim 7, wherein the portion is a lever on the module moved by the housing, the lever moving a second element when it moves, and there being a detector for detecting the movement of the second element.

9. The system as set forth in claim 8, wherein the detector is an electronic detector that can detect that the module has been placed in the housing.

10. The system as set forth in claim 7, wherein a magnet is placed in said housing and opens a switch on said module when said module is mounted into said housing, said module including a magnetic element to close said switch once said module has been powered up, and hold said switch closed.

11. A solid state power control module comprising:

a non-volatile memory;

a switch for opening to break a supply of power to a component, said switch being operable to trip when an undesirable condition is detected, and further to be opened upon receiving a control signal, and a status of said switch being stored in said non-volatile memory;

a detector on the module for detecting when the module has been mounted in a housing, and communicating with said non-volatile memory if it is determined that the module has been newly mounted in a housing; and said module queries a main controller if the detector detects that the module has been newly mounted since its last power-up, and said module moving said switch to a prior state stored in said non-volatile memory if it is not determined that the module has been newly mounted in a housing.

12. A solid state power control module comprising:

a non-volatile memory;

a switch for opening to break a supply of power to a component, said switch being operable to trip when an undesirable condition is detected, and further to be opened upon receiving a control signal, and a status of said switch being stored in said non-volatile memory;

a detector on the module for detecting when the module has been mounted in a housing, and communicating with said non-volatile memory if it is determined that the module has been newly mounted in a housing; and the status of the switch as stored in the non-volatile memory being checked against an intended status at the main controller if the determination is made that the module has been newly mounted, and wherein the status is accepted as accurate if the determination is not made.

13. A method of operating a solid state power control module including the steps of:

a) storing a status of a switch within a solid state power control module in a non-volatile memory on the module;

b) powering up the module;

c) detecting whether the module has been newly mounted in a housing, and communicating with a main controller to obtain a proper status of the switch if the determination is made that the module has been newly mounted, and moving the switch to a status stored on the non-volatile memory if no determination is made that the module has been newly mounted.

14. The method set forth in claim 13, wherein a detector element moves between a first position when it is not received in the housing, and a second position when received in the housing.

* * * * *